United States Patent [19]

Wood

[11] Patent Number: 4,710,638

[45] Date of Patent: Dec. 1, 1987

[54] APPARATUS FOR TREATING COATINGS

[75] Inventor: Charles H. Wood, Rockville, Md.

[73] Assignee: Fusion Systems Corporation, Rockville, Md.

[21] Appl. No.: 827,587

[22] Filed: Feb. 10, 1986

[51] Int. Cl.$^4$ .......................... G01J 1/00; G02B 5/10; G21K 5/00

[52] U.S. Cl. .............................. 250/492.1; 250/504 R; 350/619

[58] Field of Search ................. 250/493.1, 504 R, 503, 250/492.1; 350/619, 629

[56] References Cited

U.S. PATENT DOCUMENTS

| | | | |
|---|---|---|---|
| 3,001,055 | 9/1961 | Lozier et al. | 350/619 |
| 4,017,163 | 4/1977 | Glass | 350/619 |
| 4,101,424 | 7/1978 | Schooley et al. | 250/504 |
| 4,239,342 | 12/1980 | Aurin | 350/619 |
| 4,357,075 | 11/1982 | Hunter | 350/619 |

FOREIGN PATENT DOCUMENTS 1061592  4/1954  France .............................. 350/619
55-152567  11/1980  Japan .

Primary Examiner—Bruce C. Anderson
Attorney, Agent, or Firm—Pollock, Vande Sande & Priddy

[57] ABSTRACT

Apparatus for treating material with radiant energy, especially adapted for curing photocurable polymeric materials coated onto an optic fiber. The apparatus includes first and second reflectors which in combination form an elliptical reflector, a light source positioned at one focus of the elliptical reflector and a photocurable polymer-coated wire-like material or a fiber such as an optical fiber positioned at the second focus. An auxiliary reflector is located near the second focus in such a position as to direct light rays impinging thereon towards the second focus, thus increasing the amount of energy which impinges on the polymer coating.

9 Claims, 4 Drawing Figures

APPARATUS FOR TREATING COATINGS

This invention relates to apparatus for curing coating materials, and more particularly to apparatus for irradiating a coated fiber or wire-like element.

BACKGROUND OF THE INVENTION

Optical fibers, such as are used to transmit light in various applications, including communications, typically are coated with one or more polymeric layers which are designed to protect the optical fibers from moisture and abrasion, to reduce microbending losses, and to allow easier handling of the fiber.

In a typical method of coating an optical fiber, a liquid photocurable polymeric material is applied to the surface of the fiber and it is then cured by irradiating the coated fiber with radiant energy, as for example, ultraviolet rays.

Attempts have been made in the prior art to improve the efficiency of the coating and curing process by techniques such as modifying the polymer composition and/or the coating method and selecting optimum wavelengths of the curing radiation. One area in which it has appeared that improvements can be made in the curing process is in more efficient use of the radiant energy which is used to cure the polymer.

SUMMARY OF THE INVENTION

It is accordingly one object of this invention to provide apparatus for concentrating radiant energy onto material being treated with such energy.

It is another object to provide improved apparatus for curing liquid polymers coated onto optical fibers.

In accordance with this invention, there is provided apparatus for treating material with concentrated radiant energy comprising three (3) reflectors for concentrating radiant energy which is emitted from a source onto material which is to be irradiated. The combination of first and second reflectors, referred to herein as an elliptical reflector, comprises an elliptical surface having a first, or source focus and a second, or object focus. A light source is positioned at the first focus and material to be treated is positioned at the second focus. The third reflector, referred to herein as an auxiliary reflector, is provided with a concave reflecting surface and is positioned near the object focus with the concave reflecting surface facing towards both foci of the elliptical reflector.

This apparatus increases to a substantial extent the amount of light which is emitted at or near one focal point of an elliptical reflector and reaches the other focal point.

In the case of reflectors which have elliptical shapes, all light rays which are emitted from one focus of the ellipse will reach the other focus as long as the source is a point source; however, when the light source is not a point source but is, in fact, a volume source, the predominant portion of the light which is emitted from the light source does not originate at the focus but instead originates from points in the volume of the source which are spaced from the focus. A good portion of the light rays from a volume source will not pass through the second focus, although they will in general pass near it. In this invention, the curing apparatus includes an auxiliary reflector comprising a concave reflecting surface which is located near the object focus. This auxiliary reflector is oriented so that light rays which pass near the object focus impinge on the concave surface and are redirected in a line which passes near or through the object focus. The increased radiation which impinges on material in or near the object focus is increased to an unexpectedly large degree.

DETAILED DESCRIPTION OF THE INVENTION

The apparatus of this invention may be used in a variety of processes in which a wire-like or rod-like material is coated with a material which is to be treated with radiant energy. For example, it may be use to cure or dry paint or ink on wires or rods; however, the invention will herein be described in detail by its use in curing photocurable material which is coated onto optical fibers and is treated with ultraviolet light.

The apparatus of this invention comprises a source of radiant energy and reflectors which are adapted to concentrate the light rays emitted from the source onto a glass fiber which is coated with an uncured polymer. Compositions which are useful as coatings, methods of applying the coatings and methods for curing the coating as by the use of ultraviolet radiation are well-known in the art, and are described, for example, in U.S. Pat. No. 4,099,837 to Vazirani, U.S. Pat. No. 4,115,087 to Martin, U.S. Pat. No. 4,324,575 to Levy, and to U.S. Pat. No. 4,514,037 to Bishop et al. The composition of the coating material and the method of applying the coating material to the glass fibers do not constitute a part of this invention, and those portions of the above-mentioned patents which relate to compositions of coating materials and methods of applying coating materials to glass fibers are incorporated herein by reference.

This invention is not limited by the nature of the curing radiation and may be used, for example, with infrared or ultraviolet radiation. In the preferred embodiment of using ultraviolet radiation an electrodeless discharge lamp which is energized by microwaves is utilized, and the invention will therefore be illustrated in more detail by describing the preferred embodiment.

Figure 1:
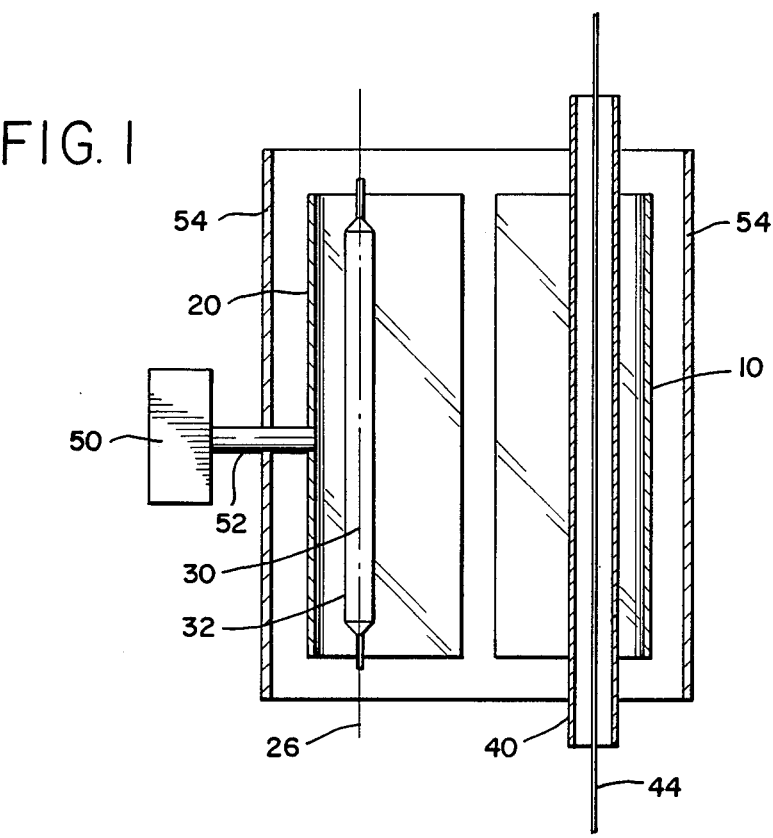
FIG. 1 is a schematic in elevation of an embodiment of this invention.

FIG. 1 shows the apparatus of this invention mounted within a housing 54 and supplied with microwave energy from magnetron 50 through waveguide 52. Apparatus for energizing electrodeless discharge lamps is well-known in the art and one embodiment is described in U.S. Pat. No. 4,359,668 to Ury.

Figure 2:
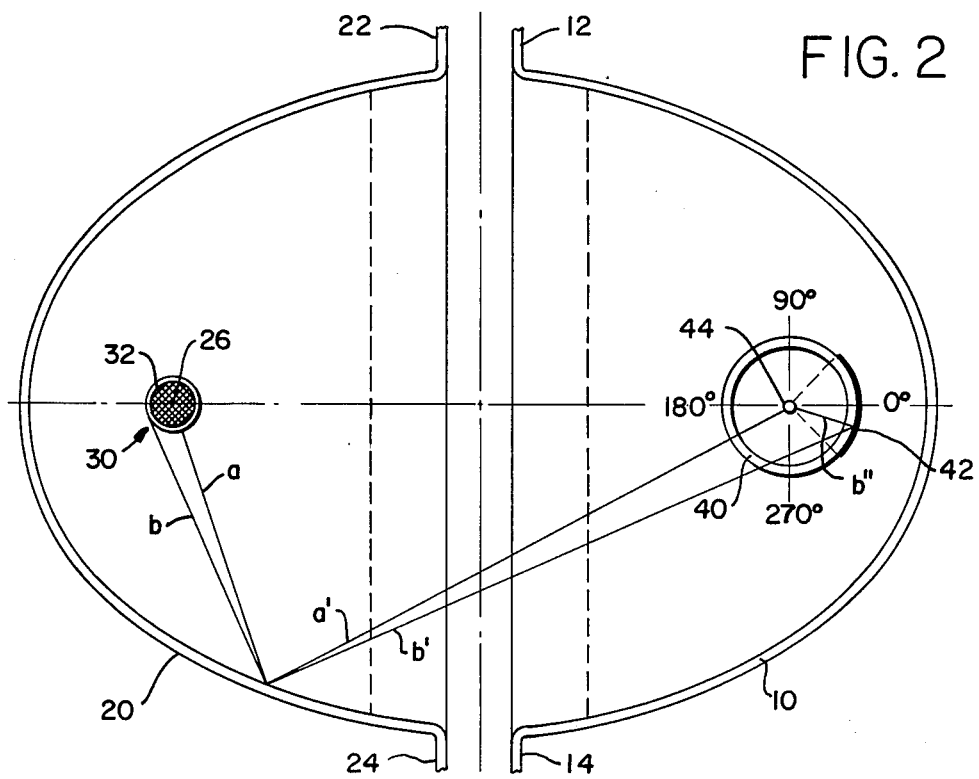
FIG. 2 is a plan view of the embodiment of FIG. 1.

In FIGS. 1 and 2, tubular electrodeless ultraviolet source 30, which is energized by microwave energy, is centered on the inner focus 26 of reflector 20, herein referred to as the source focus, and glass fiber 44 is shown at the outer focus of reflector 20, herein referred to as the object focus. Reflector 10 is disposed so that its foci are coincident with the foci of reflector 20. Transparent tube 40, preferably made of substantially pure quartz, is located with its axis substantially coincident with the object focus of reflector 20.

Reflectors 10 and 20, which in combination form an elliptical reflector, are secured together by lips 12 and 14 of reflector 10 and lips 22 and 24 of reflector 20. In the preferred embodiment of the invention, the reflectors 20 and 10 are each trough-like structures having a cross-section in the form of half an ellipse. Such an arrangement of the reflectors is not novel and is shown, for example, in Japanese Patent No. 55-152567 published Nov. 27, 1980.

In accordance with the invention, the apparatus includes auxiliary reflector 42 which is shown in FIG. 2 as being on the outer surface of tube 40. In this embodiment, the reflective surface 42 could be either on the inner portion of the tube or the outer portion of the tube; however, in the embodiment wherein the reflective surface is on tube 40, the reflective surface preferably is on the outside of the tube as shown.

Figure 4:
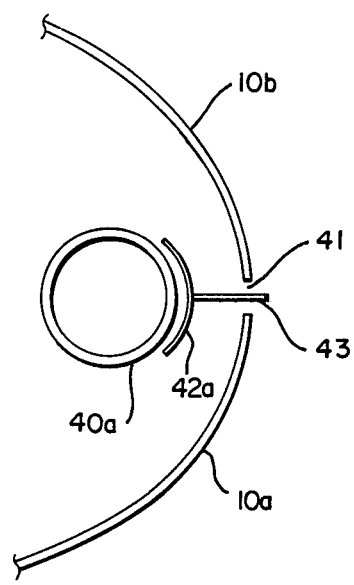
FIG. 4 is a plan view of an alternative embodiment of this invention.

Instead of being located on the surface of a cylindrical body as shown in FIG. 2, the auxiliary reflector may be an independent body such as 42a shown in FIG. 4. Auxiliary reflector 42a is held in place by support means 43 which extends through gap 41 between reflector portions 10a and 10b. It is obvious that this arrangement permits the use of an auxiliary reflector in the absence of tube 40a.

The reflective material for auxiliary reflector 42 may be any substance which reflects ultraviolet and is non-absorbent to microwave energy. An aluminized coating which is applied by techniques well-known in the art is suitable.

While there may be some variation in the shape of the arc occupied by the auxiliary reflective surface 42 and its orientation, in the preferred embodiment the arc is a portion of a circle, its midpoint lies on a line extended between the two foci of the elliptical reflector and it subtends an angle from about 80° to 100°, preferably about 90°. In the preferred form of the invention, tube 40 is a cylindrical body with its axis substantially on the object focus.

As is well known, light rays emanating from one focus of an ellipse will impinge on the other focus of the ellipse. In the embodiment of FIG. 2, light rays represented by a, which are emitted from source 30 on a line going through focus 26 will be reflected from the inner surface of reflector 20 directly towards the object focus. However, light rays which are emitted from the source at points other than those at focus 26 such as, for example, rays emitted at a tangent to the surface 32 of the source 30 as represented by line b, will not strike the other focus, althrough they will pass near it. However, a substantial portion of those rays which do not impinge directly on the object focus, are intercepted by reflector 42 and are reflected back towards the object focus. In the absence of reflector 42, these rays would strike reflector 10 and also be reflected; however, in general, those rays which do not originate on a line which passes through focus 26, and which are reflected from reflector 10 would not pass through the object focus.

EXAMPLE

In order to determine the extent to which the use of an auxiliary reflector in accordance with the invention changes the intensity of the light which passes through the object focus, an optical probe was mounted within a quartz tube in a system constructed in accordance with FIGS. 1 and 2. The quartz tube was about 1.9 cm. in diameter and the elliptical reflector had a major axis about 6 inches in length and a minor axis about 4 inches in length. The probe was rotatable and adapted to collect light directed toward the object focus from any direction within a 360° arc. The relative intensities of light rays striking the probe were measured for a system without an auxiliary reflector and for an identical system with an auxiliary reflector arranged in accordance with FIGS. 1 and 2 with the reflector occupying a 90° arc.

Figure 3:
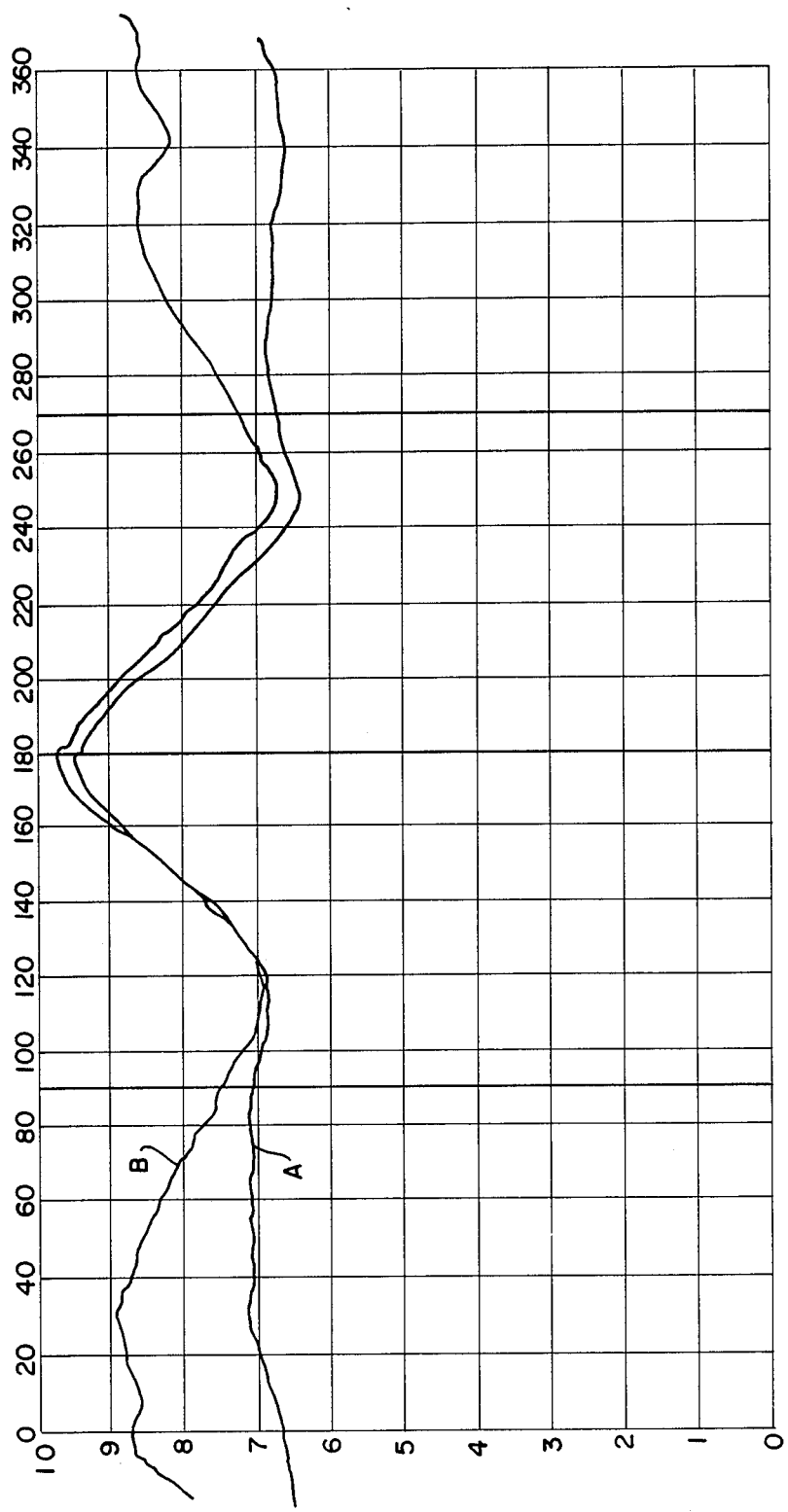
FIG. 3 is a graphical representation of the relative intensities of light coming from various directions toward the objective focus of apparatus similar to the embodiment of FIGS. 1 and 2 with and without the auxiliary reflector.

The resulting data were plotted on the graph of FIG. 3.

The lower line which is identified as "A" is for the system without the auxiliary reflector and the upper line identified as "B" is for the system with the auxiliary reflector. The angles referred to on the abscissa are as shown at the quartz tube in FIG. 2.

As can be seen, the auxiliary reflector significantly increases the intensity of light directed toward the object focus from 0° to about 90° and from about 270° to about 360°. The increase in intensity was about 18.5% in the arcs from 0° to 45° and 315° to 360°, and the overall increase in intensity was about 14°.

The embodiments described herein are intended only to illustrate the invention, and it is applicant's intention to cover all modifications which come within the scope of the invention which is to be limited only by the claims appended hereto.

What is claimed:

1. Apparatus for treating material with concentrated radiant energy comprising:
    (a) first and second reflectors comprising an elliptical reflector having a source focus and an object focus;
    (b) a volume radiant energy source positioned at said source focus;
    (c) means for positioning material to be treated with radiant energy at said object focus; and,
    (d) an auxiliary reflector having a concave reflecting surface, said auxiliary reflector being positioned near said object focus and having its concave surface facing both foci of the elliptical reflector so as to direct towards said object focus at least a portion of the radiation which originates at said source and strikes the auxiliary reflector.

2. The apparatus according to claim 1 wherein each of said first and second reflectors is a trough-like reflector which is semi-elliptical in cross-section, and said source focus and said object focus comprise substantially parallel lines.

3. The apparatus according to claim 1 wherein said source is a tubular microwave energized electrodeless light source.

4. The apparatus according to claim 1 wherein said auxiliary reflector comprises a portion of a surface of a light transparent cylindrical tube having its axis substantially on said object focus.

5. The apparatus according to claim 1 wherein said auxiliary reflector comprises a portion of the inner surface of a cylindrical quartz tube having its axis substantially on said object focus.

6. The apparatus according to claim 1 wherein said auxiliary reflector comprises reflective material deposited on a portion of the outer surface of a cylindrical quartz tube having its axis substantially on said object focus.

7. The apparatus according to claim 6 wherein the reflective surface occupies an arc on the cyclindrical tube of from 80° to about 100°.

8. The apparatus accordng to claim 6 wherein the reflective material on the cylindrical quartz tube occupies an arc of about 90°.

9. Apparatus according to claim 1 wherein said apparatus includes a light transparent cylindrical tube which has its axis substantially on said object focus, and the concave reflecting surface of said auxiliary reflector is spaced from the outer surface of said cylindrical tube to direct reflected light towards said object focus through said cylindrical tube.

* * * * *